(12) United States Patent
Schoenike

(10) Patent No.: US 7,490,433 B2
(45) Date of Patent: *Feb. 17, 2009

(54) HOOK-SETTING DEVICE FOR FISHING

(76) Inventor: Larry Schoenike, P.O. Box 1983, Sun Valley, ID (US) 83353

( * ) Notice: Subject to any disclaimer, the term of this patent is extended or adjusted under 35 U.S.C. 154(b) by 0 days.

This patent is subject to a terminal disclaimer.

(21) Appl. No.: 11/211,847

(22) Filed: Aug. 24, 2005

(65) Prior Publication Data

US 2005/0279011 A1 Dec. 22, 2005

Related U.S. Application Data

(63) Continuation-in-part of application No. 10/329,106, filed on Dec. 23, 2002, now Pat. No. 7,003,911.

(51) Int. Cl.
*A01M 93/02* (2006.01)
(52) U.S. Cl. .......................................... 43/44.91; 43/17
(58) Field of Classification Search ................ 43/17, 43/44.9, 44.91, 44.87, 44.95, 44.92, 43.1
See application file for complete search history.

(56) References Cited

U.S. PATENT DOCUMENTS

| | | | |
|---|---|---|---|
| 2,186,281 A | 1/1940 | Cochran | 43/44.9 |
| 2,591,558 A | 4/1952 | Kramer | 43/44.9 |
| 2,713,742 A | 7/1955 | Holdaway | 43/42.38 |
| 2,860,443 A | 11/1958 | Robinson | 43/44.4 |
| 2,883,785 A | 4/1959 | Croft | 43/42.09 |
| 3,029,544 A | 4/1962 | Dimatteo | 43/44.9 |
| 3,808,728 A * | 5/1974 | Ratte, Jr. | 43/44.91 |

(Continued)

*Primary Examiner*—Kurt Rowan
(74) *Attorney, Agent, or Firm*—Pedersen & Co., PLLC; Ken J. Pedersen; Barbara S. Pedersen

(57) ABSTRACT

A hook-setting device, including a flange that is fixed and generally transverse to a fishing line or leader, is adapted to resist the force of a fish strike on a hook or fly and to also indicate a strike by its movement in the water. The flange preferably floats at or near the top of the water, in a partially-submerged position, with a generally concave front surface facing the hook or fly. The front surface forms an open cup-shape that partially or completely fills with water, thereby providing resistance to the flange being pulled through the water and thereby setting the hook/fly in the fish's mouth. The preferred flange also features a generally convex rear surface facing away from the hook or fly, which rear surface is the leading surface during fly-casting, reducing air resistance during the cast and contributing to proper laying-out of the fly at the end of the cast. The preferred flange is fixed to the line or leader so that it does not move relative to the line/leader during casting, lay-out, fish strike, or at any time during use. A float may be attached to the flange, to increase buoyancy of the device; preferably, the float is coaxial with the flange and fixed to the rear surface of the flange so that there is no movement of the float relative to the flange or to the line/leader. Preferably, there is no structure between the flange front surface and the fly or hook, especially no structure that resides in, or slides into or out of the generally concave interior space of the flange, that would interfere with the interior space immediately filling with water upon lay-out and immediately providing resistance to a fish strike.

6 Claims, 13 Drawing Sheets

U.S. PATENT DOCUMENTS

| | | | |
|---|---|---|---|
| 4,205,477 A | 6/1980 | Fajt | 43/43.12 |
| 4,359,836 A * | 11/1982 | Yuji | 43/44.9 |
| 4,615,136 A * | 10/1986 | Bank | 43/44.91 |
| 4,796,377 A | 1/1989 | Hosegood | 43/43.1 |
| 4,823,495 A | 4/1989 | Camilleri | 43/43.13 |
| 4,864,767 A | 9/1989 | Drosdak | 43/43.1 |
| 5,042,190 A * | 8/1991 | Calvin | 43/43.1 |
| 5,216,831 A | 6/1993 | Halterman | 43/44.91 |
| 5,459,959 A | 10/1995 | Paradis | 43/44.89 |
| 5,758,451 A * | 6/1998 | Wolfe | 43/44.91 |
| 5,887,378 A | 3/1999 | Rhoten | 43/42.03 |
| 6,009,659 A | 1/2000 | Shannon et al. | 43/44.91 |
| 6,125,574 A * | 10/2000 | Ganaja et al. | 43/43.1 |
| 6,421,950 B1 | 7/2002 | Constantin | 43/44.98 |
| D462,413 S | 9/2002 | Teegarden | D22/126 |
| 7,003,911 B2 * | 2/2006 | Schoenike | 43/17 |
| 2002/0095853 A1 | 7/2002 | Teegarden | 43/42.1 |

* cited by examiner

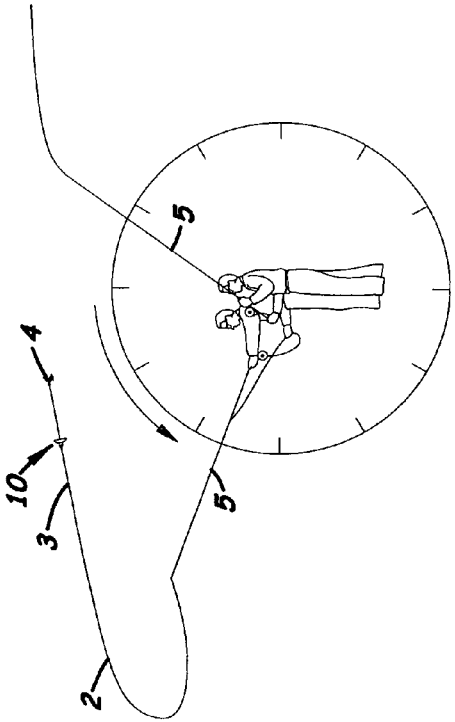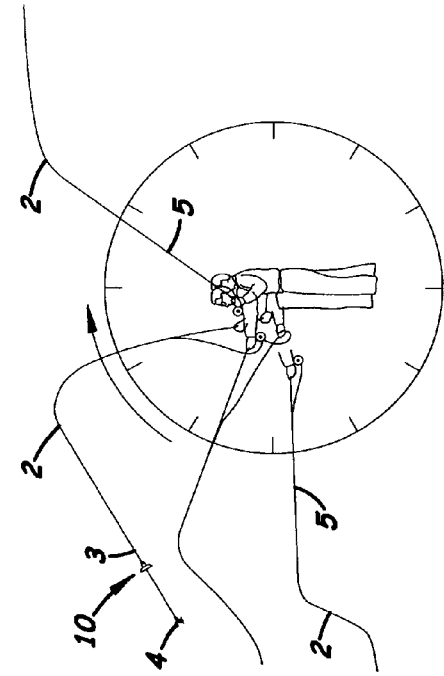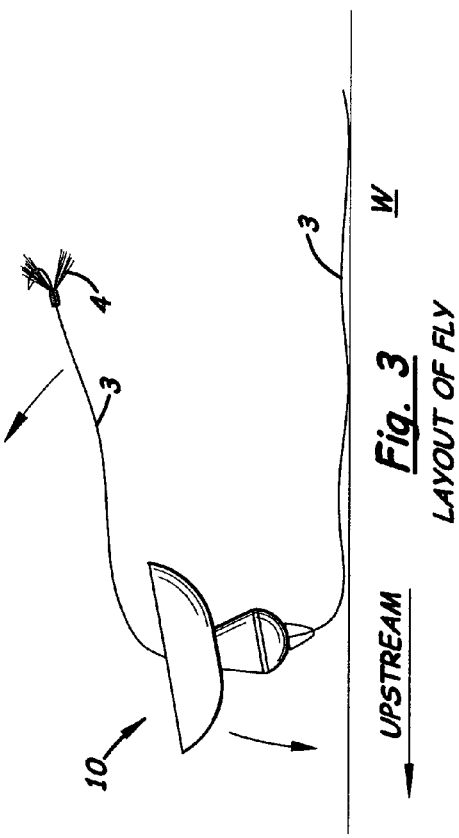

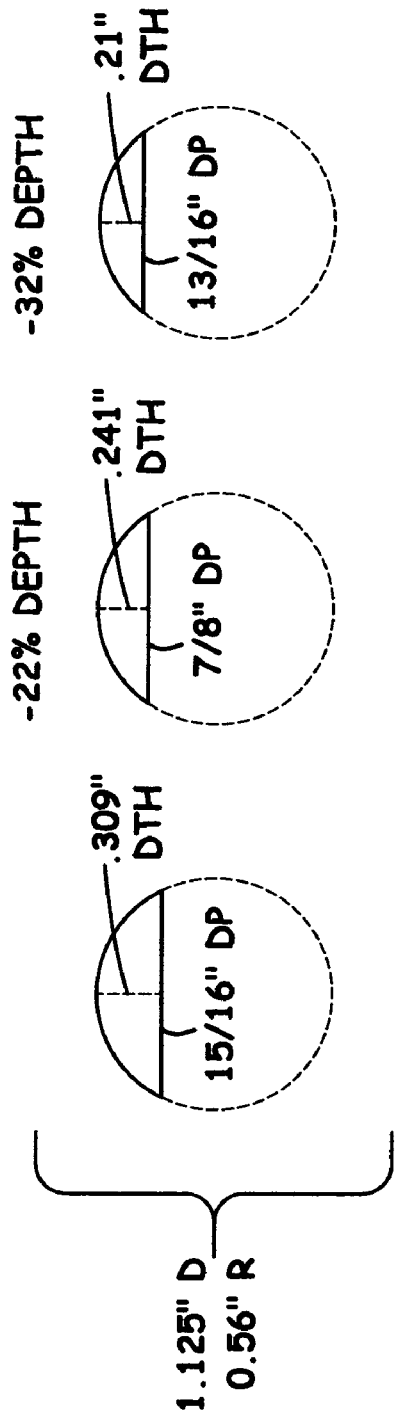
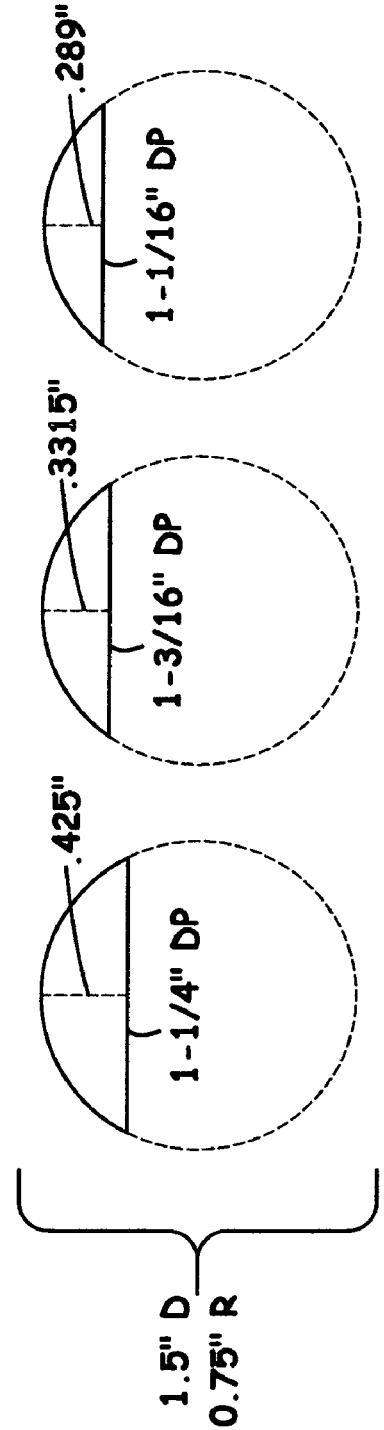
Fig. 28A, Fig. 28B, Fig. 28C, Fig. 29A, Fig. 29B, Fig. 29C

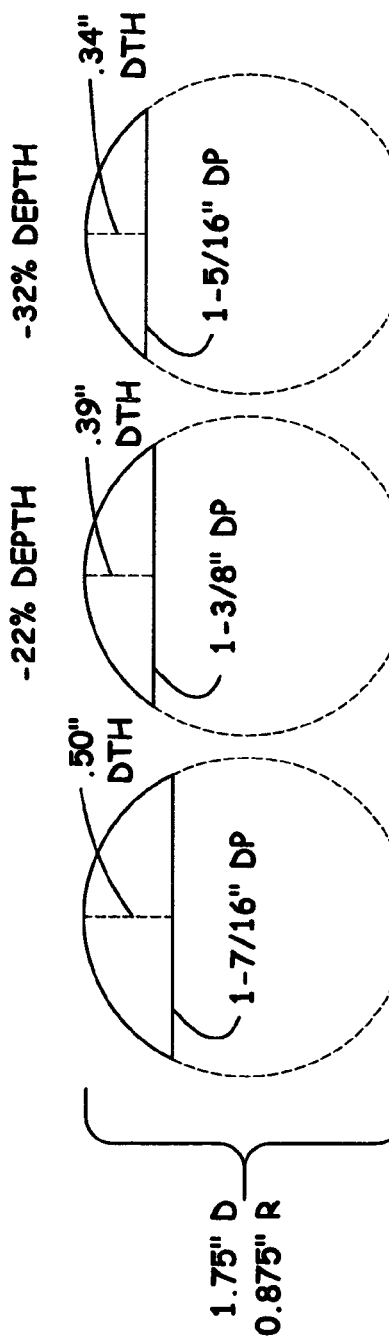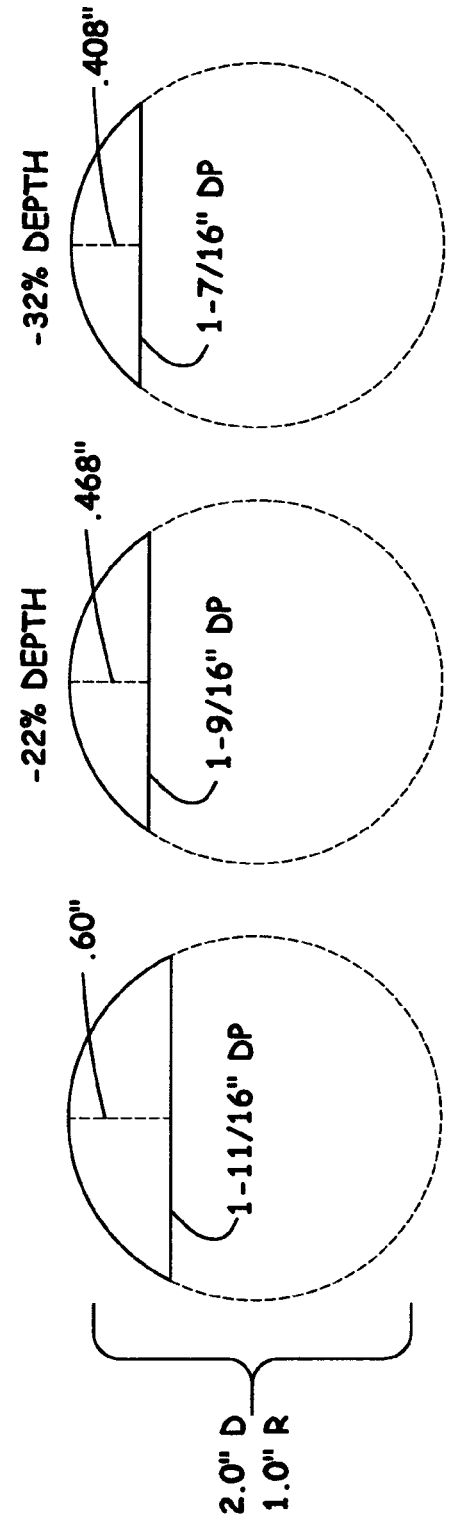

DP = 2-1/4"
R = 1-3/4"

DP = 1-3/4"
R = 2-1/4"

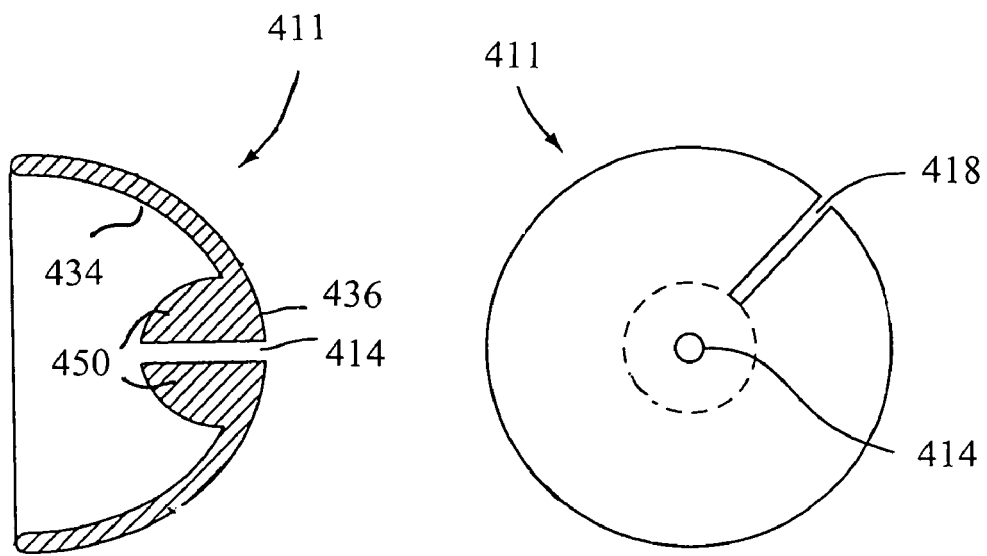
Fig. 33
Fig. 34
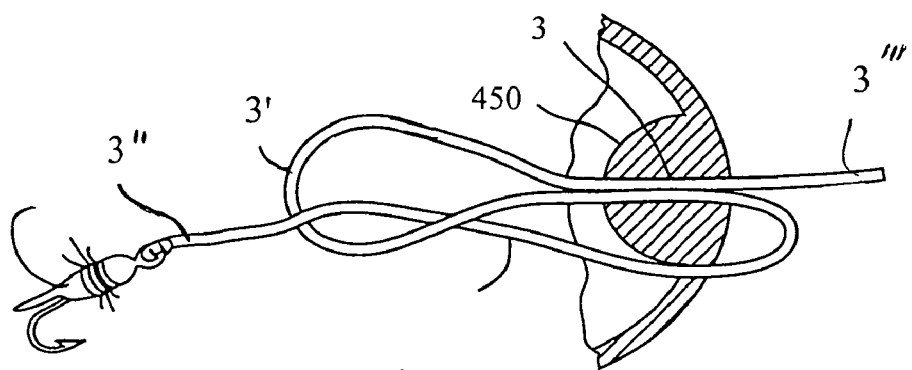
Fig. 35
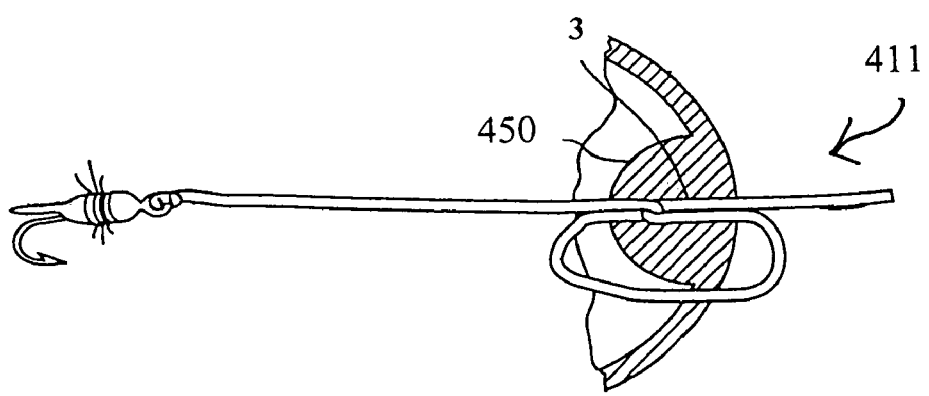
Fig. 36

HOOK-SETTING DEVICE FOR FISHING

BACKGROUND OF THE INVENTION

1. Field of the Invention

The present invention relates to fishing apparatus, and more particularly, to a hook-setting device that may also function as a strike indicator.

2. Related Art

Most recreational fishing apparatus and techniques currently being used may be classified into two general categories: 1) bait or lure fishing, using a rod and "spin" or "cast" reel, fishing line, and bait on a hook or a lure with a hook; and 2) fly fishing, using a fly rod and reel, line, leader, and a fly having a hook. Bait or lure fishing is done by the vast majority of anglers, and is the traditional way for young people to learn how to fish. Fly fishing, which has a reputation for being difficult but rewarding, is done by a smaller segment of anglers, but is growing in popularity.

Fly-fishing techniques require apparatus and methods that are very different from those of conventional bait/lure fishing, especially in view of the significant differences between fly-casting (FIGS. 1-3) and spin-casting with the spin/cast rod and reel (FIG. 4). The physics of these two methods of casting are different:

1) In fly-casting, the casting weight is the relatively heavy fly line 2, which therefore leads in travel through the air and pulls the relatively light fly leader 3 and fly 4 behind it during the rearward and forward steps of the cast (FIGS. 1 and 2). In other words, the relatively heavy line 2, which extends between the fly rod 5 and the leader 3, travels in front of the leader 3 and the fly 4. As the line 2 approaches the surface of the water W, it flips out in front (upstream) of the angler, and lays out the leader 3 and fly 4 upstream, so that the fly is preferably the most upstream portion of the fishing apparatus (FIG. 3). Typically, the layout occurs at the end of the cast, but when the line is still a few feet above the water; thus, in a "whip-like" manner, the end of the apparatus, which is the distal end of the leader and the fly, is flipped upstream to lie on the water and then starts floating downstream toward the angler. 2) In spin-casting, the lure or other bait 6 is the casting weight, so that the lure or bait 6 leads, rather than follows, in travel through the air (FIG. 4) In other words, in spin-casting, the lure or bait travels in front of the line 7.

Therefore, the aerodynamics for the equipment used in the two types of fishing are different. In a fly cast, the side facing away from the fly is the side of an object attached to the fly leader that leads during the cast (FIGS. 1 and 2). In a spin cast, the side facing toward the bait or lure is the side of an object attached to the line that leads during the cast (FIG. 4).

Halterman, Jr. (U.S. Pat. No. 5,216,831) discloses a strike indicator which is reported to be "useful in fly fishing, ice fishing and light bait fishing, which provides slippage resistant attachment along a static fishing line." The Halterman, Jr. strike indicator comprises a bifurcated strike indicator body with a stretchable tab slightly shorter than the strike indicator. The fishing line passes through a longitudinal slit and is held therein by the stretchable tab.

Calvin (U.S. Pat. No. 5,042,190) discloses a fly-fishing strike indicator that is moveable on a fishing leader but at the same time can maintain its position on the leader when a fly is cast. A knot of surgical tubing is made on the leader and a cover of thermoplastic, heat shrinkable tubing is slid over the knot to surround the leader and knot. The ends of the cover are then heated to constrict the ends loosely about the leader to form an air pocket between the leader and cover.

Constantin (U.S. Pat. No. 6,421,950) discloses a strike-indicating fly line with a plurality of spaced apart bands along a section of the line visible to an angler. The bands and the spacing between the bands is such that they can be discerned in use by the angler, so that the angler can "see when the line stops drifting or changes direction, indicating a fish strike."

Wolfe (U.S. Pat. No. 5,758,451) discloses a two-floatation-unit bobber system for bait/lure fishing, wherein an inner bobber is pulled by the fish strike out from the larger bobber. In order for the Wolfe bobber system to work, the inner bobber must distance itself from the outer bobber, and this is done by the inner bobber pulling the line through the outer bobber, with the outer bobber sliding along the line, as the inner bobber is pulled deeper into the water. The two bobbers becoming separated is a visual signal to the angler that a strike has occurred. The Wolfe bobber system floats "face-down" in the water, as is typical of bait/lure bobbers and floats.

Kramer (U.S. Pat. No. 2,591,558) discloses a bait/lure fishing float that aims at limiting the drifting action of the float by providing a chambered body with fins and a closure member for the chamber. Kramer discloses a finned, substantially closed bell-shaped float, which "faces down" in the water and partially fills with water via a tubular member that opens only a small portion of the flat face of the float.

Teegarden (U.S. Publication US2002/0095853) discloses a wobble device that slides freely along a fishing line and provides a cup-shape facing away from the hook. The cup-shape is reported to "impart a life-like wiggling motion to the natural and artificial fishing baits and lures, including flies, real and plastic worms, rubber baits, and other lures."

There is still a need for an improved apparatus for setting a hook and indicating a strike in fishing. There is especially a need for such a device that is effective in fly fishing.

SUMMARY OF THE INVENTION

The present invention comprises a flange that is fixed, and generally transverse, to a fishing line or leader, and that is adapted to resist the force of a fish strike on a hook or fly. The flange preferably floats at or near the top of the water, by virtue of the lightness of the line or leader to which it is connected, the lightness of the flange itself, and/or a float that may be used with or that is integral with the flange. In the preferred, partially-submerged position of the flange in use, the surface of the flange facing the hook or fly has contact with the water sufficient to resist the fish strike, and yet a portion of the flange, and/or all or part of the optional float, may be visible to the angler for strike indication.

The flange surface facing the hook or fly preferably is generally concave and forms an open cup-shape that, immediately upon layout on the water, tends to enter a position wherein the cup opening faces upstream, the cup outer perimeter is generally vertical in the water, and the cup partially or completely fills with water. In this position, the preferred flange provides resistance to the flange being pulled through the water in a direction the concave surface is facing. The open cup-shape resists the force of a fish strike on the hook or fly and helps to set the hook/fly in the fish's mouth.

The preferred flange for fly-fishing applications also features a generally convex surface facing away from the hook or fly. This generally convex surface is the leading surface of the preferred flange during fly-casting, reducing air resistance during the cast and contributing to proper laying-out of the fly at the end of the cast.

In an alternative embodiment, the flange may be configured to sink into the water, immediately upon layout, to an extent wherein it is entirely below the water. Such a flange would completely fill with water, but otherwise would act generally the same as the partially submerged versions, entering a position in the water wherein the cup opening faces generally upstream and the cup outer perimeter is generally vertical in the water. In the submerged position, the submerged flange would also provide resistance to the flange being pulled through the water in a direction the concave surface is facing, resisting the force of a fish strike on the hook or fly and helping to set the hook/fly in the fish's mouth.

Therefore, an object of the present invention is to provide a device that provides a hook-setting function and preferably also a strike indication function. A further object is to provide an apparatus that is sufficiently light-weight so as to limit its interference with casting, and that has a shape that is effective for fly-casting.

BRIEF DESCRIPTION OF THE DRAWINGS

FIG. 1 is a schematic side view of a fly-fisherman performing the rearward portion of a fly-fishing cast, using one embodiment of the invented hook-setting device on the fly-fishing leader.

FIG. 2 is a schematic side view of the fly-fisherman performing the forward portion of the fly-fishing cast, using the apparatus of FIG. 1.

FIG. 3 is a close-up view of the end of a fly-fishing cast, wherein the device of FIGS. 1 and 2 is flipping over on or above the water and the fly is being "laid-out" upstream of the angler (not to scale).

FIG. 4 is a schematic view of a bait/lure angler performing a conventional spin-cast, wherein the bait/lure is the casting weight and therefore leads in travel through the air.

FIGS. 28A, B, and C are schematic views of flanges curved on a 0.56 inch radius and having varying depths.

FIGS. 29A, B, and C are schematic view of flanges curved on a 0.75 inch radius and having varying depths.

FIGS. 30A, B, and C are schematic view of flanges curved on a 0.875 inch radius and having varying depths.

FIGS. 31A, B, and C are schematic view of flanges curved on a 1 inch radius and having varying depths.

FIG. 33 is a side cross-sectional view of another embodiment of the invented hook-setting device, without a float.

FIG. 34 is a rear view of the device of FIG. 33.

FIG. 35 is a partial, cross-sectional view of the device of FIGS. 33 and 34, being fixed to a leader by means of the leader being tied around a central protrusion of the flange.

FIG. 36 is a partial, cross-sectional view of the device of FIGS. 33-35, with the leader being tightened around the central protrusion of the flange.

DETAILED DESCRIPTION OF THE INVENTION

Figure 5A:
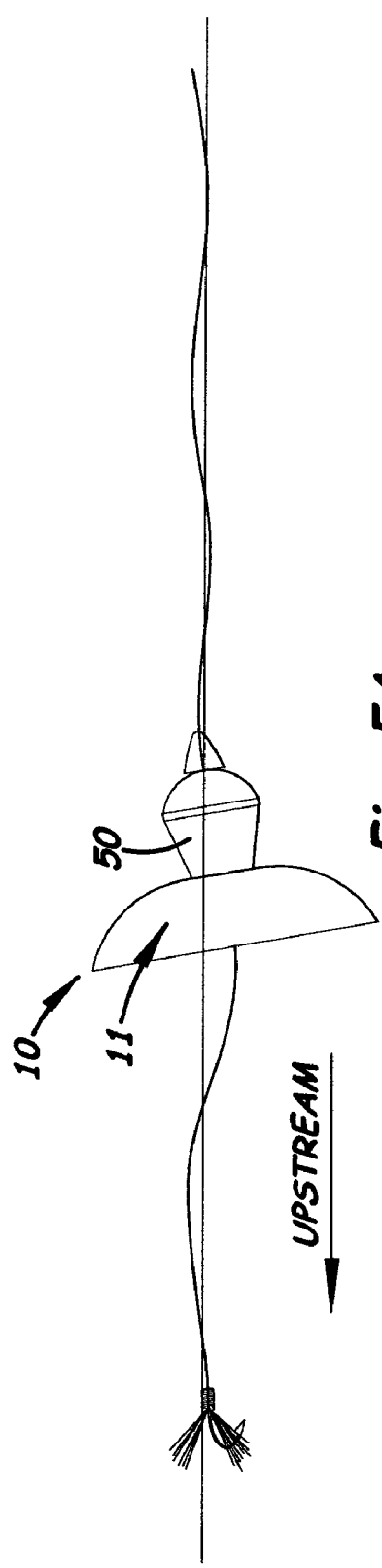
FIG. 5A is a side view of the hook-setting device embodiment of FIGS. 1-3, in the water in use on a fly-fishing leader with a dry fly (not to scale).

Referring to the figures, there are shown several, but not the only, embodiments of the invented hook-setting device for fishing. The embodiments may have applications in all types of fishing, but are particularly well-adapted for fly fishing. Therefore, the following detailed description focuses on applications of the preferred apparatus in fly fishing, but is not necessarily intended to limit the invention to fly fishing.

Two of the most difficult techniques for inexperienced fly fishermen/women are knowing when a fish has struck the fly and setting the hook. The fish often ejects the fly from its mouth before the person realizes that the fish has struck and can take action to set the hook in the fish. The preferred embodiments of the invention are particularly well-adapted for improving the problematic areas of hook-setting and strike indication, without interfering with proper fly-casting techniques.

As discussed in the Related Art section above, fly-fishing techniques are very sensitive to the type, size, shape, and weight of the apparatus being used. An object attached to a fly-fishing leader should be very lightweight, so that it does not interfere with proper fly-casting, including not interfering with the weight balance between the relatively heavy fly line and the relatively light fly leader and fly assembly. Therefore, the inventor believes that it is very important that a hook-setting device and/or strike indicator attached to a fly-fishing leader be specially designed to meet the important aerodynamic and weight considerations that may result in successful fly fishing.

The preferred embodiment of the hook-setting device 10, 110, 210, 310, 410 comprises a flange 11, 111, 211, 311, 411, that is fixed to a fly-fishing leader 3 at a distance from the fly 4. The flange extends generally transverse to the leader, and preferably extends all the way around the leader 3, or at least substantially all the way around the leader 3. In the embodiment 10 of FIGS. 1-3, 5A-11, the flange 11 is a generally cup-shaped disc formed by a thin, curved wall 12 having a diameter substantially larger than the diameter of the leader. The flange 111 of the embodiment in FIGS. 1-3 and 5A-11 extends continuously 360 degrees around the leader 3, with an aperture 14 through the flange at its central axis for receiving the leader 3. The aperture 14 is through the wall(s) of a recess 16 that receives a portion of the float 50.

In the embodiment 110 of FIGS. 12-16, the flange 111 extends substantially continuously 360 degrees around the leader 3 (in this example, approximately 355-359 degrees), with the non-continuous feature being a narrow slit 118 from near the central axis to the outer perimeter 120, for aiding in installation of the flange 111 on the leader 3.

In the embodiment 210 of FIGS. 17-22, the flange 211 extends substantially continuously 360 degrees (in this example, approximately 345-359 degrees) around the leader 3, with the non-continuous feature being a slit 220 through the disc wall with slanted walls 222 forming a "trough" or "channel" in the flange with the bottom of the trough or channel being slit open.

Figure 11:
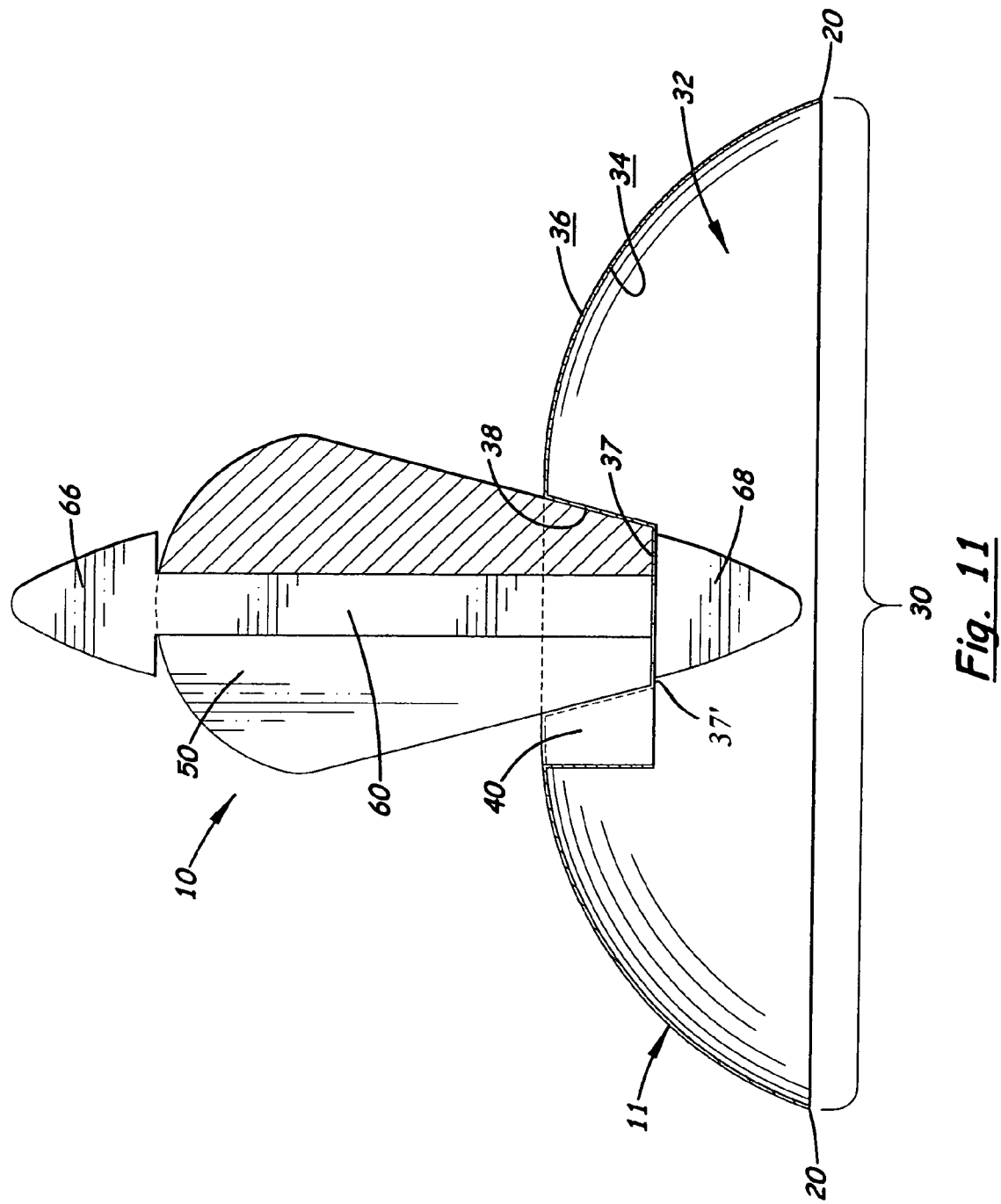
FIG. 11 is an enlarged, cross-sectional view of the embodiment of FIGS. 6-10, viewed from the direction indicated by the line 11-11 in FIG. 6.
Figure 12:
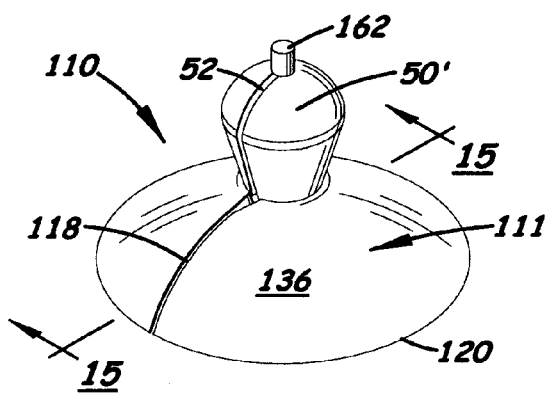
FIG. 12 is a rear perspective view of another embodiment of a hook-setting device according to the invention, removed from the leader or line, and including one embodiment of a float.
Figure 14:
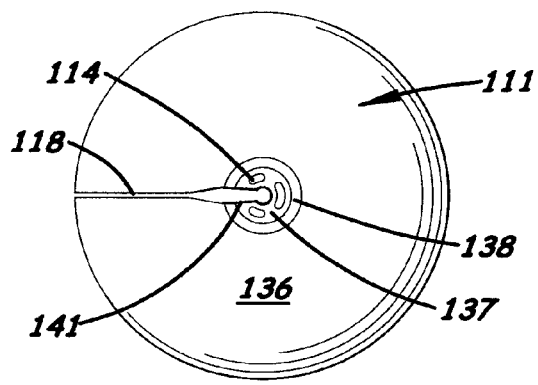
FIG. 14 is a rear view of the flange of the device of FIGS. 12 and 13, with the float having been removed.
Figure 13:
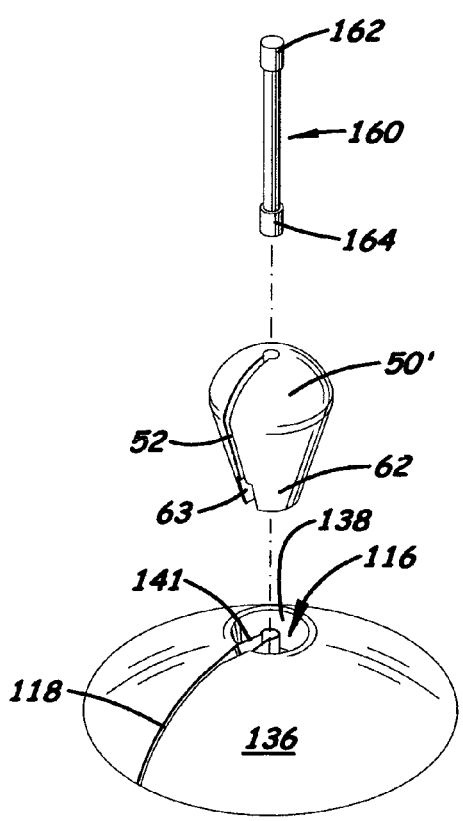
FIG. 13 is an exploded rear perspective view of the device of FIG. 12.
Figure 15:
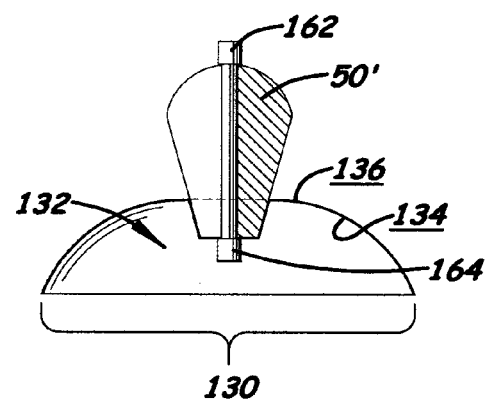
FIG. 15 is a side cross-sectional view of the device of FIGS. 12 and 13, viewed along the line 15-15 in FIG. 12.
Figure 16:
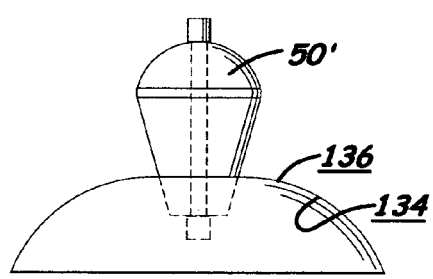
FIG. 16 is a side view of the device of FIGS. 12, 13 and 15, turned 90 degrees from the view of FIG. 15.
Figure 17:
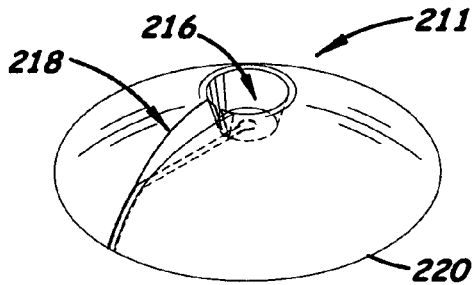
FIG. 17 is a rear perspective view of another embodiment of a flange according to the invention, removed from the leader or line.
Figure 19:
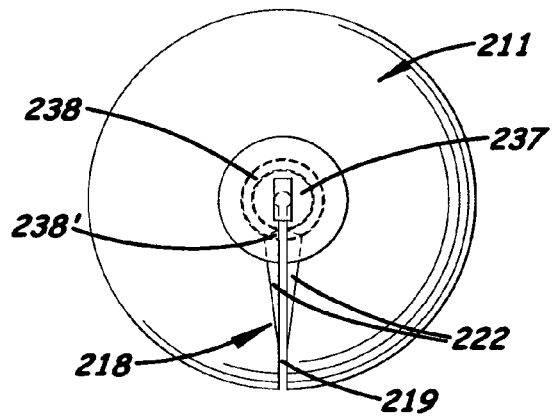
FIG. 19 is a rear view of the flange of FIGS. 17 and 18.
Figure 18:
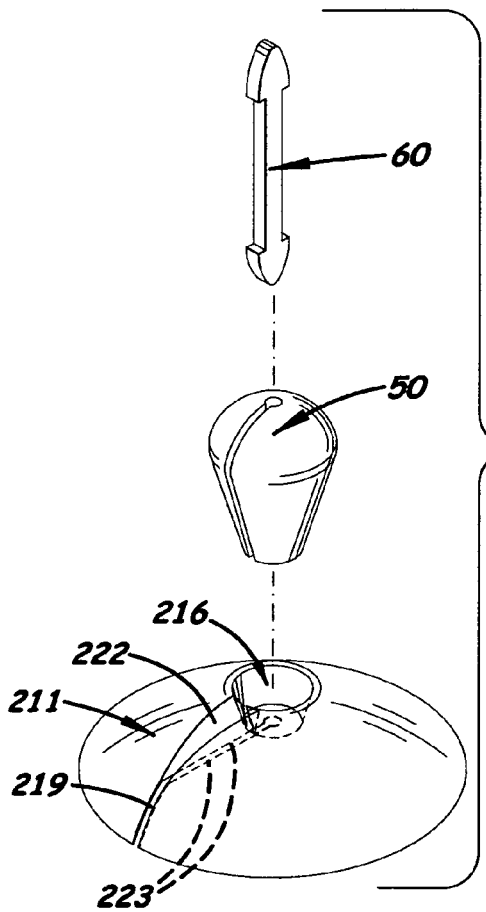
FIG. 18 is an exploded rear perspective view of the flange of FIG. 17 combined with one embodiment of a float.
Figure 20:
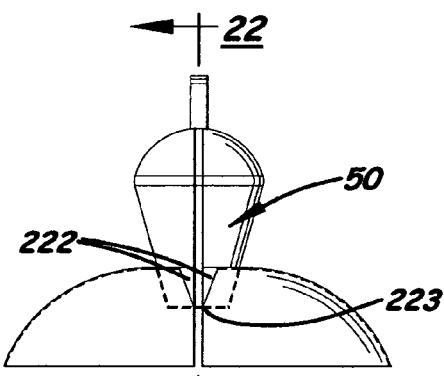
FIG. 20 is a side view of the device of FIG. 18, with the flange shown in cross-section.
Figure 21:
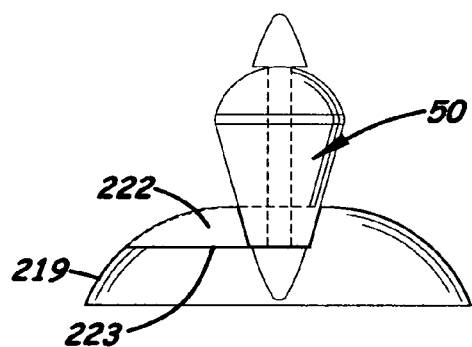
FIG. 21 is a side view of the device of FIGS. 18 and 20, turned 90 degrees from the view of FIG. 20, with the flange shown in cross-section.
Figure 22:
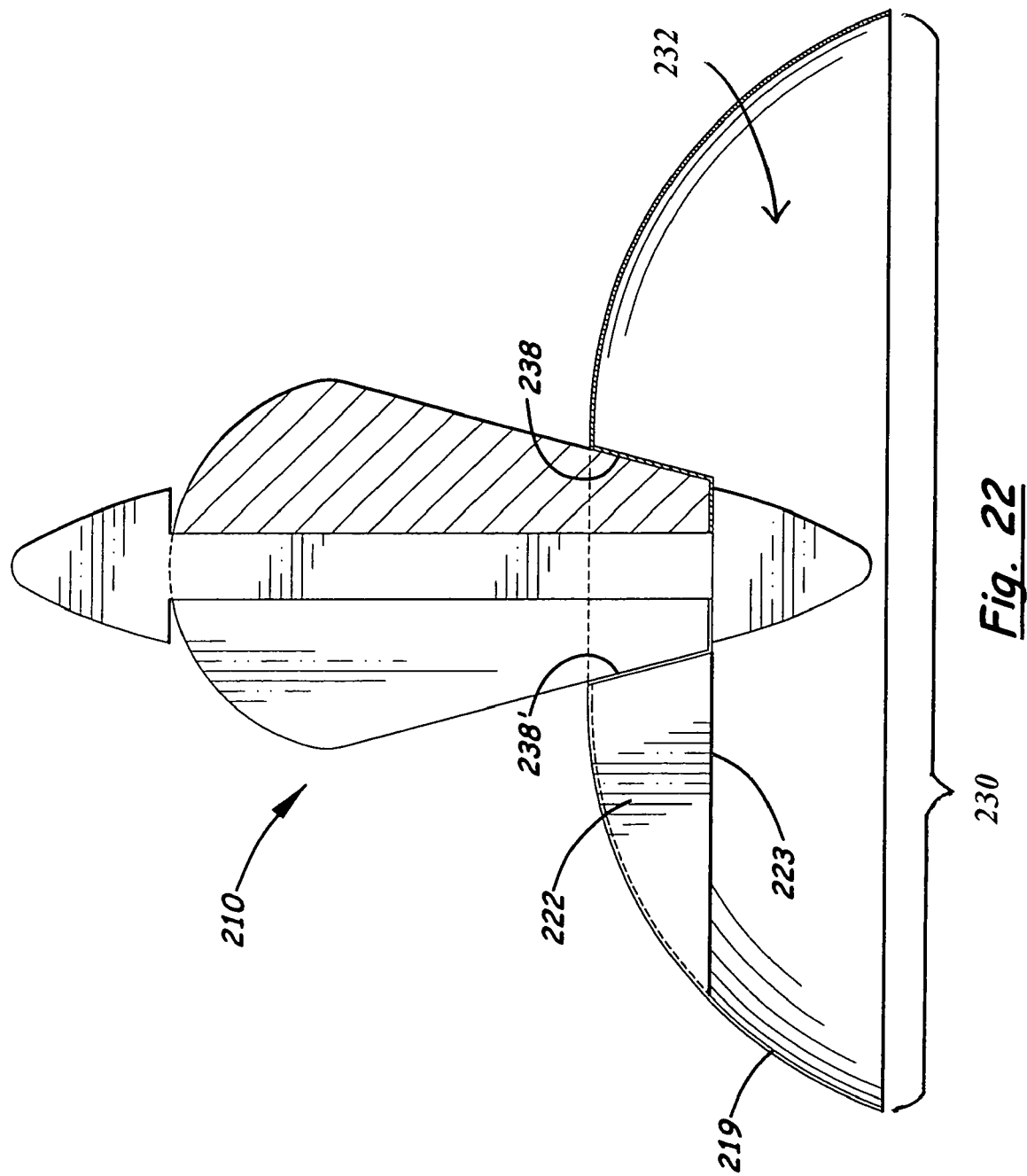
FIG. 22 is an enlarged, cross-sectional view of the device of FIGS. 18, 20 and 21, viewed along the line 22-22 in FIG. 20.

The enlarged, crossed sectional views in FIGS. 11 and 22 illustrate the preferred thin, substantially-uniform-thickness wall of the flanges 11, 211, and the openings 30, 230 into the cupped interior 32, 232 that extend entirely or substantially across the entire diameter of the flange. The wall 12, 212 of the embodiments portrayed in FIGS. 11 and 22 is preferably, but not necessarily, about 10-30 thousandths of an inch in thickness. Thicknesses of 20-30 thousandths of an inch are believed to be attainable in a precise manner with injection molding, while thicknesses of 10-20 thousandths of an inch are believed to be attainable in a precise manner with vacuum molding. Thinner wall thicknesses (for example, 10-20 thousandths of an inch) are generally preferred because such flanges tend to be very light weight, and, hence, tend to interfere less with fly casting than thicker-walled flanges. Thinner walls (for example, 10-20 thousandths of an inch) are therefore especially desirable for light-weight embodiments, which are intended to float at or near the top surface of the water preferably with the aid of a small float or buoyant portion at the rear of the flange. However, thicker walls (for example, 20-30 thousandths of an inch) may be desirable as well, for example, for embodiments that need higher wall strength and which may be configured to sink below the water surface, or, in applications for use at or near the top surface of the water, may be configured to receive or attach to a float or buoyant portion (again, preferably at the rear of the flange).

Figure 23:
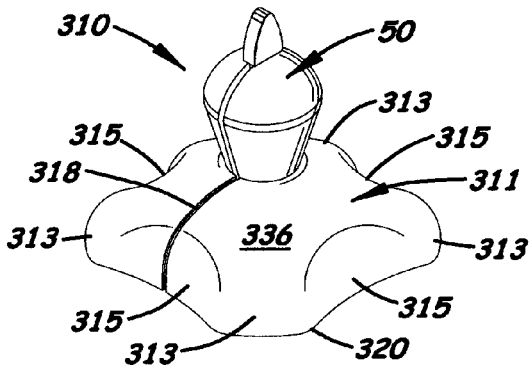
FIG. 23 is a rear perspective view of another embodiment of a hook-setting device according to the invention, removed from the leader or line.
Figure 25:
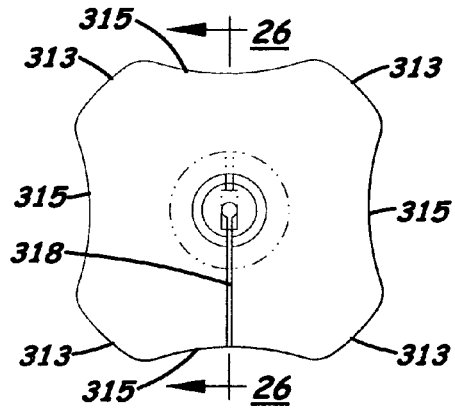
FIG. 25 is a rear view of the flange of the device of FIGS. 23 and 24, with the float having been removed.
Figure 24:
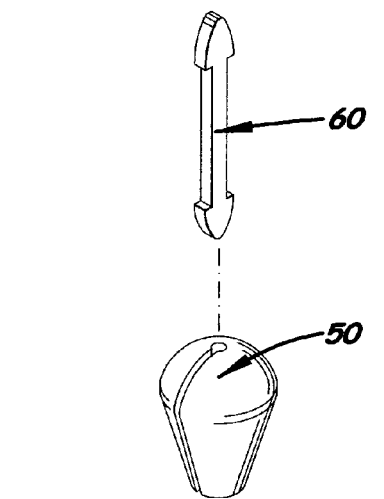
FIG. 24 is an exploded rear perspective view of the device of FIG. 23.
Figure 26:
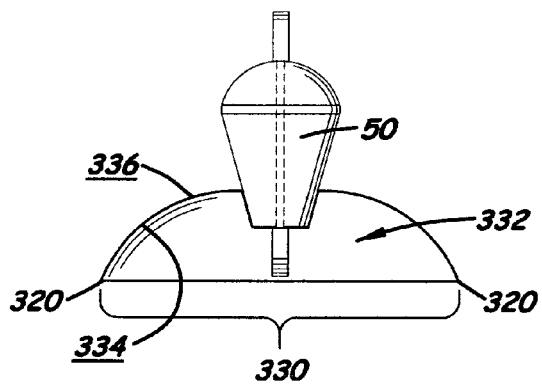
FIG. 26 is a side view of the device of FIGS. 23 and 24, with the flange shown in cross-section and viewed along the line 26-26 in FIG. 23.
Figure 27:
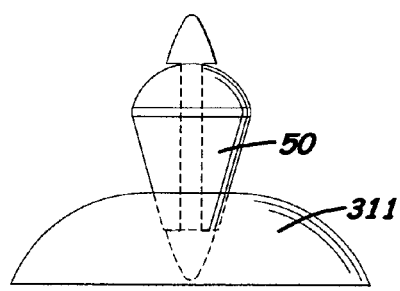
FIG. 27 is a side view of the device of FIGS. 23, 24, and 26, turned 90 degrees from the view of FIG. 26.

As may be seen from the drawings, each of the flanges 11, 111, 211 is curved on a single radius (in which case the flange could be called a "spherical cap") or curved on multiple radii that are very close to each other (in which case the flange could be called "generally a spherical cap"). Other shapes and wall thicknesses may be used. For example, a flange with a non-circular perimeter and non-spherical wall may be used, such as the wavy or undulating flange 310 illustrated in FIGS. 23-25. However, the flange 310 in FIGS. 23-25 still has a thin wall with a generally concave front face and a generally convex rear face and may still be called "generally cup-shaped."

Disc walls other than those having a generally constant thickness may be used, especially if a varying or uneven wall thickness assists in achieving the desired strength and low-weight characteristics of the disc. For example, a disc wall may be thicker near the center and thinner near the outer perimeter, or may have thicker radial portions, between relatively thinner portions, reinforcing the wall.

However, whether the flange is a spherical or generally spherical cap with a circular perimeter, or whether it is a non-spherical disc with a non-circular perimeter, or even another overall shape, it is preferred to provide the flange with a rear surface that has a convex portion or, more preferably, that is substantially or entirely convex, for optimizing fly casting. Also, whatever the overall flange shape, it is preferred to provide the flange with a front surface that has a concave portion or, more preferably, that is substantially or entirely concave, for optimizing hook-setting.

The inventor has found that a rear surface with a convex portion, or that is substantially or entirely convex, is particularly effective for providing the desired aerodynamics of casting and layout of the fly and leader upstream of the strike indicator, with the leader between the fly and the indicator and preferably fully extended in a generally straight line. On the other hand, flanges with a flat or substantially flat rear surface do not properly lay out the fly and instead allow the leader and fly to "pile up" generally on top of, or near, the flange on the water. The inventor believes that the ineffective cast with devices having a flat or substantially flat rear surface is due to the air resistance offered by the flat or substantially flat surface moving forward during a cast.

The inventor has found that a front surface that has a concave portion, or that is substantially or entirely concave, exhibits superior hook-setting and strike indicating capabilities. The hook-setting device is fixed to the leader, at a distance preferably in the range of 2-8 feet from the fly. Once the fly is properly laid out upstream, with the leader and the hook-setting device downstream of the fly, the strike indicator remains generally that distance from the fly while the hook-setting device, leader, and fly travel downstream. This distance from the fly helps prevent the hook-setting device from being too close to the fly and giving the fly an unnatural appearance.

Figure 5B:
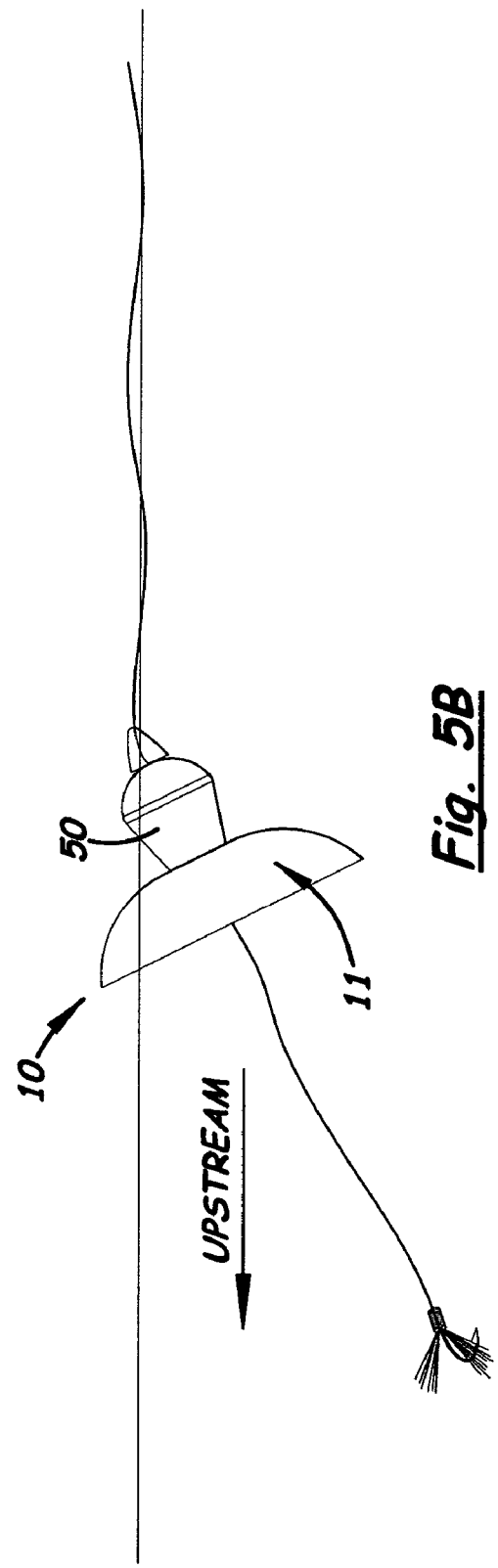
FIG. 5B is a side view of the hook-setting device of FIG. 5A in the water in use on a fly-fishing leader with a wet fly (not to scale).
Figure 6:
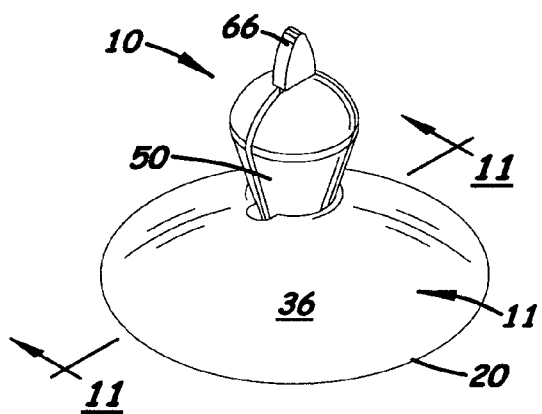
FIG. 6 is a rear perspective view of the hook-setting device of FIGS. 1-5, removed from the leader or line, including one embodiment of a float.
Figure 8:
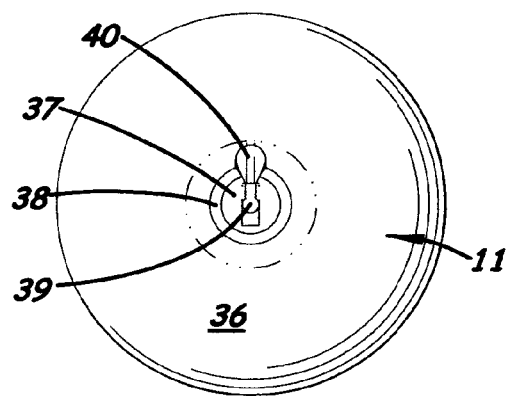
FIG. 8 is a rear view of the flange of the device of FIGS. 6 and 7, with the float having been removed.
Figure 7:
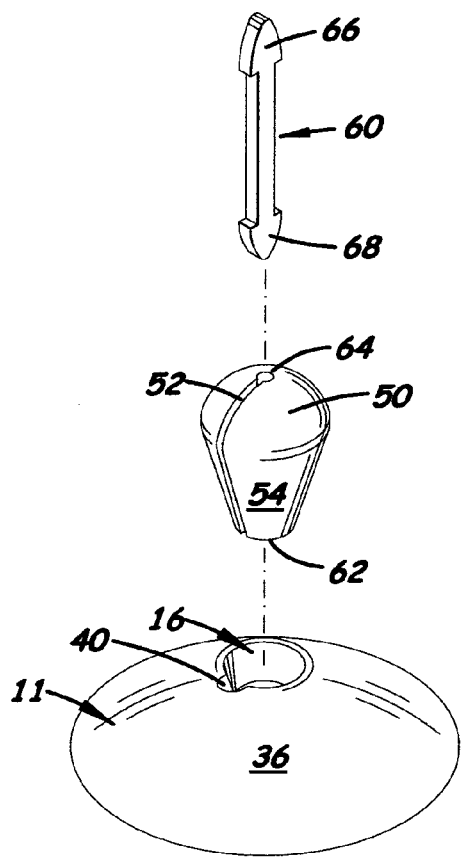
FIG. 7 is an exploded rear perspective view of the device of FIG. 6.
Figure 9:
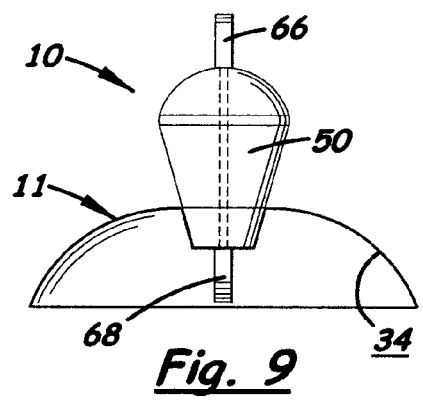
FIG. 9 is a side view of the device of FIGS. 6 and 7, with the flange shown in cross-section.
Figure 10:
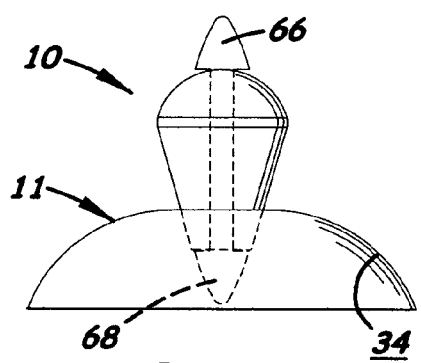
FIG. 10 is a side view of the device of FIGS. 6, 7, and 9, turned 90 degrees from the view of FIG. 9.

As illustrated in FIGS. 5A and 5B, after the lay out of the fly, the preferred hook-setting device 10 is nearly instantaneously partially filled with water, and floats partially submerged (typically about ⅔-¾ submerged) and generally vertically near the top surface of the water W. By "generally vertical" it is meant that the outer perimeter 20 of the flange (which may also be the "outer extremity" of the flange and the perimeter surrounding the "opening" of the cup-shaped disc) preferably lies in a plane that is generally vertical. As may be seen in FIGS. 5A and 5B, the use of a dry fly 4' vs. a wet fly 4 may also effect the orientation of the hook-setting device 10 in the water, but both the orientations shown in FIGS. 5A and B are herein called "generally vertical." Preferably, whether in use with a dry or wet fly (with nymphs being included in the term "fly"), the outer perimeter 20 of the flange will be in the range of greater than 45 degrees up to about 90 degrees relative to the horizontal surface of the water, and more preferably from about 60-90 degrees relative to the horizontal surface of the water. This orientation is preferably the same even with completely-submerged devices that may be 2 in.-2 ft. below the water, for example.

The nearly instantaneous (less than 1 second, and more typically less than 0.5 seconds) positioning of the preferred embodiments in the substantially-water-filled, generally vertical orientation is important because the most effective casts deliver the fly only about 3-4 feet upstream of a fish. Fish tend to face upstream, waiting for an insect to float downstream, and tend to strike upstream. Therefore, a fly that is properly positioned nearly instantaneously, and that appears natural (at least in part because the hook-setting device is "out of the fish's view"), will more likely be struck by the fish, and will be struck quickly. Because of the orientation and the substantially-water-filled or completely-water-filled condition of the flange, and because the flange is fixed and immovable along the line/leader, the resistance occurs instantaneously, or nearly instantaneously (less than 1 second, and, more typically less than 0.5 seconds).

As the preferred hook-setting device is carried downstream by the flowing water, the force of the water against the concave surface will result in significant resistance to a fish strike. As most fish strike a fly in an upstream direction, this upstream force on the fly/hook will be strongly opposed by the downstream force of the water against the concave surface of the flange. This causes the hook to be set in the fish's mouth as soon as, or soon after, the fish strikes the fly, without requiring action by the angler.

Generally concurrent with the fish strike being resisted by the preferred flange, the hook-setting device will exhibit some movement that is inconsistent with the previous downstream travel of the device—clearly signaling the fly-fisherman of the strike, so that the fisherman may then sharply raise the fly-rod, contributing additional hook-setting force to the fly. Thus, the preferred concave flange surface facing the fly 4, 4' is particularly well-adapted for both hook-setting and indication functions, as it provides substantial resistence and yet allows some movement to indicate a strike, especially upon a strike upstream.

In general, the diameter across the opening of the flange (diameter of the outer perimeter "DP") is selected to provide sufficient resistance in the water for hook-setting, but not too much resistance in the air during casting. The depth of the cup-shape ("DTH") is selected to provide the preferred rear face curvature for proper casting and the preferred front face curvature for hook-setting. The preferred flanges have a diameter DP that is preferably equal to or greater than ¾ inch, more preferably between ¾ inch and 1¾ inches, and most preferably between 1⅛ and 1⅜ inches. The depth DTH preferably ranges from about 0.2 inch to about 0.6 inch, and more preferably from about 0.3 inch to 0.6 inch. The radius R preferably ranges from about ½ inch to about 1 inch.

As explained earlier in the Description, other flange shapes, sizes, and curvatures may be used besides the "partial sphere" shapes illustrated by the "generally spherical caps" of FIGS. 1-3 and 5A-22 and the "spherical caps" of FIGS. 28-31. The "partial-sphere" shapes are preferred because they has been found to exhibit the strength, light weight, and effective aerodynamics and effective water capture needed for effective fly casting, hook-setting, and strike indication. A cone is not preferred for the flange shape, because it tends to be too heavy when formed with an opening in the preferred range of diameters that are selected for good water capture.

FIGS. 28-31 include examples with diameter DP ranging from ¹³⁄₁₆ inch (FIG. 28C) to 1¹¹⁄₁₆ (FIG. 31A); depth DTH ranging from 0.21 inch (FIG. 28C) to 0.60 inch (FIG. 31A); and radius R ranging from 0.56 inch (FIGS. 28A-C) to 1 inch (FIGS. 31A-C). The flanges of FIGS. 29A-C and 30A-C are preferred; the flanges of 31A-C are still effective in many applications but less preferred as they offer more resistance during casting and a less-optimum lay-out; and the flanges of FIGS. 28A-C are effective in some applications but are less preferred as they may provide less-than-desired hook-setting resistance. Thus, the preferred flanges from FIGS. 29A-C and 30A-C are in the range of about 1¹⁄₁₆-1⁷⁄₁₆ inches in diameter DP; 0.289-0.5 inches in depth DTH; and curved on about 0.75-0.875 inches in radius R.

Examples of Flanges Tested

The present inventor has tested multiple flanges according to various embodiments of the invention for proper casting, lay-out, and hook-setting. These include:

Depth (DTH) of Flanges of Various Curvatures (R) and Outer Perimeter Diameters (DP)

| Diameter (Radius), inches Outer Perimeter Diameter DP, inches | A 1⁷⁄₁₆ (Approx. ¹¹⁄₁₆) Depth DTH, inches: | B (Approx. ¹³⁄₁₆) | C 1¹³⁄₁₆ (Approx. ¹⁵⁄₁₆) | D 2 (1) | E 2⅛ (1¹⁄₁₆) | F 2½ (1¼) | G 3¹⁵⁄₁₆ (Approx. 2) |
|---|---|---|---|---|---|---|---|
| 1 | 0.309 | 0.272 | 0.241 | 0.210 | 0.179 | 0.1483 | <0.2 |
| 1³⁄₁₆ | 0.348 | 0.306 | 0.2714 | 0.2366 | 0.202 | 0.167 | <0.2 |
| 1¼ | 0.386 | 0.339 | 0.301 | 0.2625 | 0.2239 | 0.185 | <0.2 |
| 1⅜ | 0.425 | 0.374 | 0.3315 | 0.289 | 0.2465 | 0.204 | <0.2 |

For example, from the above table column A, one will note that four flanges with a spherical curvature of approximately ¹¹⁄₁₆ inches (R) were made with different outer perimeter diameters DP (1 inch through 1⅜ inches). This resulted in flange depths DTH ranging from 0.309-0.425 inches. In column B, four flanges with a curvature (R) of ¹³⁄₁₆ inches were made with the same DP's, resulting in DTH's ranging from 0.272-0.374 inches. In column C, four flanges with a curvature of ¹⁵⁄₁₆ inches (R) were made with the same DP's, resulting in DTH's ranging from 0.241-0.3315, and so forth in columns D-G. All flanges had wall thicknesses of about 20 thousandths of an inch, which resulted in all being less than 20 grains in weight.

The inventor's testing, by fly-casting and -fishing with the flanges, indicated that the flanges in columns A-C were highly effective in good casting, good layout, instant positioning in water, and excellent hook setting. The flanges in column D were marginal in performance, and the flanges in columns E-G were poor in performance, probably due to their "flatness."

Figure 32A:
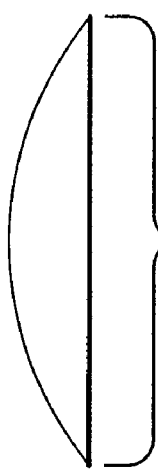
FIGS. 32A and B are schematic view of flanges curved on a large radius and having shallow depths.
Figure 32B:
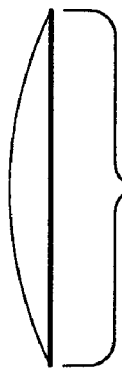
FIG. 32C is a schematic view of flange with a flat portion, all resulting in "flat" flanges that may be less preferable or ineffective.
Figure 32C:

Flanges that are "shallow" or "flat" by virtue of having a large radius R and small depth DTH are less preferred because they tend not to cast well, either because they provide too much air resistance during the cast and/or they do not lay out the fly properly. For example, the flanges in columns E-G of the above Table are less preferred or entirely ineffective, and the shapes in FIGS. 32A and B are also less preferred or entirely ineffective, because they are too flat. The flange shape in FIG. 32C is also less preferred, or may be entirely ineffective, even though it is an overall size similar to those in FIGS. 31A-C, because of the large flat central area on its rear surface. The inventor notes that, while some flatness on the rear surface, and/or at the rear end of a float, may be acceptable and is included in the terminology "generally convex", a large or substantial flat area is not desirable. For example, greater than ½ of the rear of the device (including the rear end of the float) being flat is not desirable, and so it is desired that less than ½ of the rear, and more preferably less than ¼ of the rear, of the device (including the rear end of the float) is flat.

Many of the preferred flanges have protrusions or other non-concave portions in their front surfaces, for example, the recesses of the flanges 10, 110, 210, and 310, which are recesses when viewed from the rear of the flange but are protrusions when viewed from the front of the flanges. Also, the flange shown in FIGS. 33-36 has a protrusion at its central axis that extends into the interior space of the cup-shape. In general, the protrusions provide structure extending axially relative to the main flange wall, for example, to which a float may be attached, and/or around which the leader may be fastened (for example, with the leader being looped around the protrusion, as shown in FIGS. 35 and 36, or without the leader being looped around the protrusion) so that the flange is fixed to the leader and stays transverse to the leader, and/or so that the overall strength/rigidity of the flange may be increased.

In addition to, or instead of, a protrusion in the front surface of a flange, some flanges may also have protrusions extending from their rear surfaces. For example, a buoyant portion may be integrally formed and protrude from the rear surface of the flange, or other protrusion(s) may extend from the rear surface to give the flange additional structure for attachment to the leader, for receiving a float, and/or to otherwise affect its position in the water, for example. Optionally, a flange with a protrusion from its rear surface may include a recess(es) in its front surface. Optionally, a flange may have no protrusion in its front surface or its rear surface, and other methods of attachment of the flange to the leader may be used, such as integral molding, adhesives, or fasteners or grippers that do not require significant axial structure on the flange.

Referring in Detail to the Figures:

As illustrated in FIGS. 1-3, 5A and 5B, the preferred hook-setting device 10 is positioned on the leader 3 a distance from the fly 4, 4', preferably 2-8 feet from the fly, with the concave surface 34 facing the fly. The rearward and forward cast maintain the hook-setting device with its convex surface 36 traveling into the air, so that the device experiences minimal air resistance and causes minimal interference with the cast. When the line reaches the water, it flips the leader upstream, and the fly is laid out as shown in FIG. 3. FIGS. 3, 5A and 5B are not to scale, in that they, for convenience, show the flange 11 as too large compared to the distance of the flange from the fly 4; the preferred hook-setting device is preferably several feet from the fly and its diameter DP is only about ¾-1¾ inches, compared to a typical leader's diameter of about 0.004 inches at its small distal end and about 0.21 inches at its larger proximal end.

Referring specifically to the embodiment in FIGS. 6-10, device 10 comprises a flange 11 and a float 50 connected to the flange 11 at or near the center of the flange. The flange 11 features a generally cup-shaped disc wall 12, with a rear side/surface 36 that is generally convex, and a front side/surface 34 that is generally concave. The outer perimeter 20 of the flange 11 defines and surrounds an opening 30 into the interior concave space 32 of the cup-shape. The flange 11 comprises a recess 16 that receives an end 62 of the float 50 to position the float generally coaxial with the flange. The recess 16 has a bottom wall 37, a side wall 38, and a slot 39 through the bottom wall 37 starting at the center axis of the flange, and extending radially to the side wall 38 and into an alcove 40 in the side wall.

The float 50 has an axial slit 52 from its outer side surface 54 to its center axis, all along the length of the float, and a removable grip member 60 that extends axially through the slit 52 to extend from both ends 62, 64 of the float. A first end 68 of the grip member 60 extends through the slot 39 in the bottom wall, and is held there by the enlarged "arrow" shape of the end 68. The grip member 60 holds the flange 11 and float 50 together, by the elasticity of the grip member 60 and its first end 68 abutting against the front surface 37' of the bottom wall and its second end 66 abutting against the outer end 64 of the float. Alternatively or additionally, the float 50 may frictionally grip the wall(s) of the recess 16, and/or be adhesively or otherwise fastened or connected to the flange 11.

The device 10 is attached to the fly-fishing leader by inserting the leader 3 through the slit 118 in the flange and along side or inside the slit 52 in the float. With the float 50 inserted into the recess 16, the user may grasp the leader 3 in a few fingers of each hand (typically the ring and little finger of hand). The user then grasps the flange 11, which holds the first end 68 of the grip member, with one hand (typically thumb and first finger), and grasps the float 50 with the other hand (typically thumb and first finger). The user pulls the flange 11 and float 50 apart slightly, which stretches the grip member 60 and narrow its width, leaving room in the slit 52 for the leader. The user may then tighten the leader 3 between his/her hands, or otherwise manipulate the leader so that it slides radially further into the slit 52 along side the narrowed grip member 60. The user then twists the float 50 relative to the flange 11, which typically serves to twist the grip member around the leader to further grip and capture the leader 3 inside the float 50. The inventor has found that by following this procedure, and by keeping track of how many times he/she twists the float 50 relative to the flange 11 (preferably 3-4), he/she may more easily remove the leader 3 from the float 50 by twisting the float in the opposite direction that same number of times.

After following the above preferred procedure or other procedures, the leader passes through the float and the flange, and is gripped/captured inside the float by the twisting/circling of the resilient and rubbery grip member preferably more than once around the leader. The hook-setting device 10 will be unable to slide, or extremely unlikely to slide, along the leader and is therefore, fixed to the leader 3.

The grip used in the float and flange may be of the type known to anglers as a rubber grommet. Other elastic and/or rubbery grip members may be used, for example, a length of elastic tubing or other resilient material, with or without caps or other enlarged ends. Elastic tubing without caps or enlarged ends may be generally as effective as the preferred rubber grommet, and such elastic tubing may typically be used without twisting it around the leader, by simply letting it expand to take up space and "plug" the slit of the float and/or flange so that the leader is blocked from exiting the slit(s).

While the arrow-ended grip members are shown with flanges that have slits all the way from the outer perimeter to the center of the flange, and also with flanges that do not have such slits, such grip members are preferred with flanges that do have the slits due to the thickness of the grip members and the size of their arrow-ends. In embodiments with slits all the way from the outer perimeter to the center, the grip member may be stretched and slid "sideways" through the slit for easy initial installation. Elastic tubing without caps or enlarged ends may be especially useful for flanges without slits from outer perimeter to flange center, as the ends of such tubing may be installed axially through an aperture with less resistance than the larger arrow-ends.

Also, while the generally flat, arrow-ended grip members may be shown in the Figures as being orientated in the float and/or flange so that their planes are parallel to the slit of the flange and the slit of the float, the user will typically turn the grip member, after installation, about 90 degrees in the flange and float relative to its position shown in the figures. This way, the plane of the grip member will be transverse to the flange slit and float slit, and, hence, the grip member will be unlikely to slide out "sideways" from the float or flange.

The float shape shown in the Figures is preferred, but other shapes and sizes may be used, with the goal of providing a device total weight of less than or equal to 30 grains, and more preferably, less than or equal to 20 grains (for example, comprising a flange weight of preferably less than 10-15 grains, a float weight of about 2-8 grains, and a rubber grip member of about 1-2 grains). The float 50 gives sufficient buoyancy to the device to keep the device at or near the top surface of the water, with preferably about a ⅓ or less portion of the flange 11 above water and about a ½ portion of the float 50 above water, so that at least these portions are visible to the angler. If the flange 11 is made of a fairly clear and/or colorless material, even the portion above water may not be very visible, but preferably the float 50 is made of a closed-cell foam or other white or colored buoyant material, so that especially the portion above water will be visible. In some embodiments, a flange may be to sink farther into the water than is shown in FIGS. 5A and 5B. This may be done with denser plastic and/or by removing the float, for example.

In the embodiment of FIGS. 6-11, the leader 3 is inserted through the slot 39 in the flange with the fly/hook 4 removed from the leader 3. While this may be less preferred from a convenience point of view, it is preferred for increasing strength and rigidity of the flange at a low flange weight because it allows a flange without a slit extending to the outer perimeter.

FIGS. 12-22 illustrate some, but not the only, embodiments that may include a slit 118, 218 all the way to the outer perimeter 120, 220 of the flange, for allowing the leader 3 to be inserted radially rather than axially into the flange 111, 211. The device 110 of FIGS. 12-16 includes a flange 111 and float 50', which are connected together in a manner similar to that of the device of FIGS. 6-11, except that the grip member 160 is an elastic tube with capped ends (caps 162, 164 instead of arrow ends 62, 64). The flange 111 features a generally cup-shaped disc wall, with a rear side/surface 136 that is generally convex, and a front side/surface 134 that is generally concave. The outer perimeter 120 of the flange defines and surrounds an opening 130 into the interior concave space 132 of the cup-shape. The flange 111 comprises a recess 116 that receives a first end of the float and that has a bottom wall 137, a side wall 138, and a optional island wall 141 that upends from the bottom wall 137. The optional island wall 141 surrounds an aperture 114 in the bottom wall at the center axis of the flange, and its two generally parallel, spaced wall portions extend to the side wall 138 to create an opening in the side wall that communicates with a radial slit 118 in the flange. The radial slit 118 extends all the way across the flange from the recess 116 to the outer perimeter 120. The slit 118 opens at the outer perimeter 120 so that a leader 3 may slide through the flange from the outer perimeter to the center axis aperture 114. Thus, the leader need not be "threaded" through a small hole near the center of the flange (with the fly and hook removed, or with only a very small fly being used) but instead a middle portion may be slid radially into the flange with the fly and hook already attached to the distal end of the leader. The optional island wall 141 strengthens and reinforces the flange, helping prevent it from breaking or from flexing out of operable shape in spite of the length of the slit 118. In a wet-fly, submerged-flange embodiment, for example, wherein a thicker flange wall of 20-30 thousandths of an inch is expected to be acceptably strong, the island wall may be eliminated.

The float 50' of the device 110 in FIGS. 12-16 is similar to that of FIGS. 6-11, except that it has an enlarged slit region 63 in its bottom end that accommodates the optional island wall 141. A high density polystyrene float cooperating with this flange 111 will typically need this enlarged slit region in order to fit around the optional island wall; different float materials may not need this enlarged slit region because they may be more flexible and resilient. With this float and optional island wall configuration, the slit 52 of the float will remain aligned with the slit 118 in the flange and so the leader might be pulled out from the float slit 52 and the flange slit 118, if it were not for the grip member 160 being twisted/encircled around the leader.

The device 210 in FIGS. 17-22 comprises a flange 211 with a slit 218 all the way from the recess 216 to the outer perimeter 220. Slit 218 is defined along part of its length, near the outer perimeter, simply by a cut 219 through the disc wall. The slit 218 is defined along another part of its length, nearer the recess, by slanted walls 222 extending into the interior cup space of the flange to form a V-shaped channel. At the "bottom" of the V-shaped channel, the slanted wall 222 bottom edges 223 are preferably on a plane that is co-planar with the bottom wall 237 of the recess. Also, the side wall 238 of the recess has a V-shaped opening 238' into the V-shaped channel. This provides a flange structure that may be easier to mold than the embodiments in FIGS. 12-16, and that may be stronger and less likely to break or flex out of operable shape during use.

The hook-setting device 310 in FIGS. 23-27 comprises a flange 311 with four lobes 313 separated by four concave side portions 315. Still, the overall shape of the flange comprises a generally concave front surface 334 and a generally convex rear surface 336. A slit 318 extends from the central recess to the outer perimeter 320, and the float is held in the central recess by the elastic grip member 60. As in the other illustrated embodiments, the front side of the flange is substantially open, with an opening 330, into the generally cup-shaped interior space 332, extending preferably all the way across the outer perimeter 320.

The embodiments portrayed in FIGS. 1-27 include a separable float, but other embodiments may include a buoyant portion that is permanently attached or even integral with the flange. Alternatively, a flange may be used without a float or float portion, for example, as shown in FIGS. 33-36. Embodiments such as the flange 411 in FIGS. 33-36 are preferably designed out of material with dimensions and thickness to float at or near the surface of the water without the additional float or float portion. The addition of a float or float portion, however, will increase the options for different materials, wall thicknesses, and sizes and shapes of flange, as the buoyancy of the device will not be so dependent upon the characteristics of the flange itself.

The flange 411 in FIGS. 33-36 comprises a hemispherical, open cup-shape, with concave front surface 434 and concave rear surface 436, and opening 430 that extends substantially all the way across the flange outer extremity. A central bore 414 extends axially through the protrusion 450, and a slit 418 extends from the outer perimeter radially toward, but not all the way to, the central hole bore. This way, the slit 418 does not communicate with the central hole bore, and a line or leader cannot be slid from the slit into the central hole bore. This way, there is a portion of the protrusion 450 around which the leader may be looped, as shown in FIGS. 35 and 36. A loop 3' of leader is inserted through the central bore 414 from the rear surface 436, and the distal end 3" of the leader (with the fly) is slid into the slit 418 and through the loop 3' of leader. The two ends of the leader 3" and 3'") are pulled tight, capturing the flange 411 in such a way that the flange cannot slide along the leader 3 as long as the leader is kept tight around the protrusion portion. Optionally, a float may be added to the flange of FIGS. 33-36, for example, by using a rubber grommet or other grip member that extends through a slit in a float and through the central hole bore, wherein the leader could also extend through the slit in the float.

Figures 37, 38, 39:
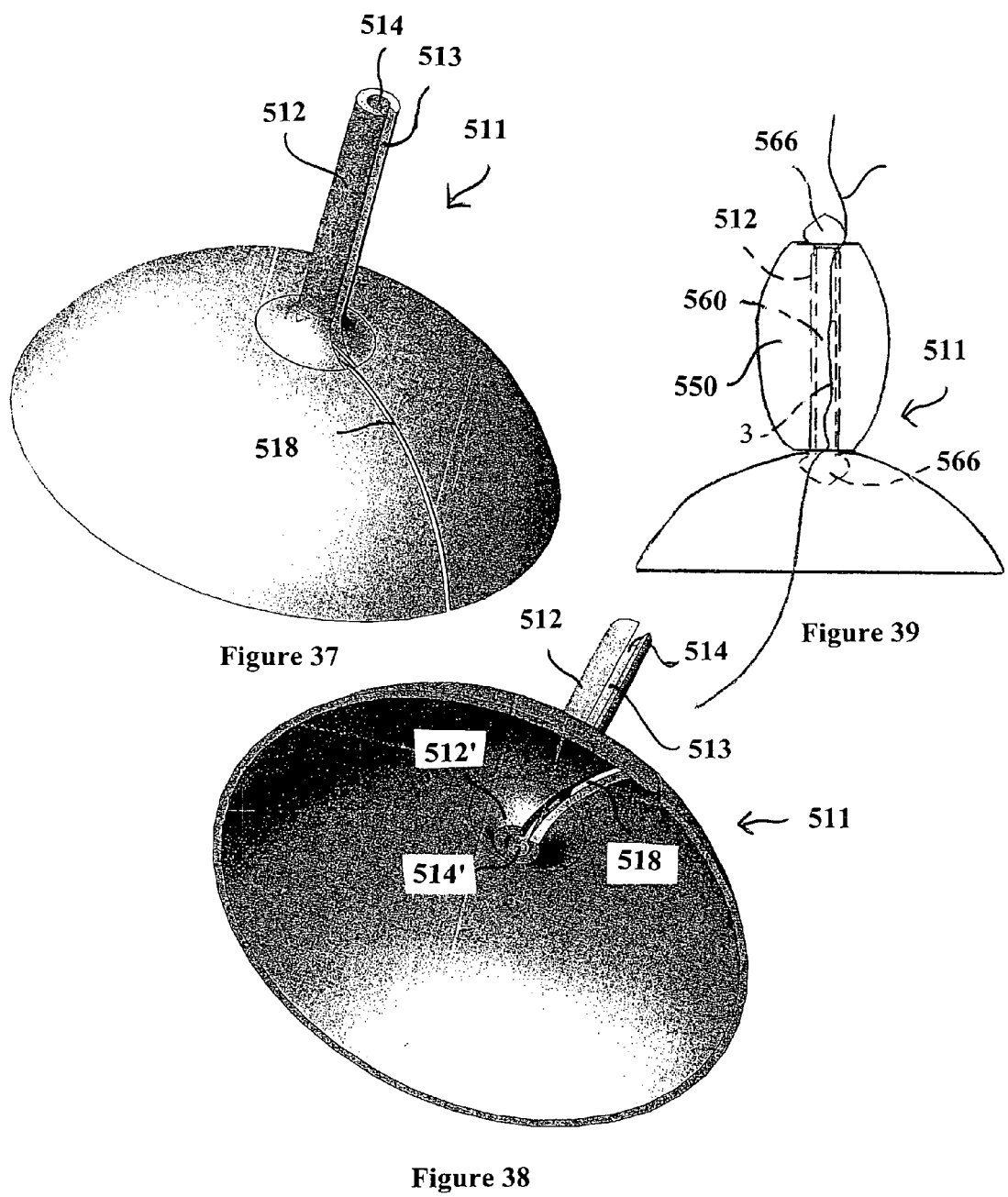
FIG. 37 is a rear perspective view of another embodiment of the invented hook-setting device, having a tubular, slitted protrusion extending from the rear side of the flange.
FIG. 38 is a front perspective view of the embodiment of FIG. 37.
FIG. 39 is a schematic view of the embodiment of FIGS. 37 and 38, with a float installed on the tubular protrusion and the leader extending through the axial passageway of the protrusion, and a grip member installed inside the tubular protrusion and connecting the float to the flange and retaining the leader inside the protrusion.

An embodiment having a protrusion extending from the rear surface is portrayed in FIGS. 37-39. Flange 511 has a main flange wall that is preferably a spherical cap, and a tubular protrusion 512 extending from the flange rear side. The protrusion 512 has an axial slit 513 all along its length into its central passageway 514, which extends all the way through the flange wall to provide an opening 514' on the front side of the flange. One may see in the front perspective view, FIG. 38, that a small protrusion 512' extends into the flange interior space, for additional strength/reinforcement of the connection of the protrusion 512 to the main flange wall. Preferably, but not necessarily, the flange 511, including the main flange wall (the portion generally transverse to the axis of the flange and generally transverse to the line/leader) and the protrusion, is integrally molded as one piece. Further, the flange has a slit 518, from the flange outer perimeter to the central axis of the flange, that connects to the passageway 514. This way, a leader 3 may be slid sideways through the slit 518 and slit 513, into the passageway (including opening 514' in front protrusion 512'), so that it extends generally axially through the flange. A grip member 560 may also be stretched and slid "sideways" through slits 518, 513, and then released and/or twisted around the leader, to grip the leader, the inner surface of the protrusion 512, and to have its enlarged ends 566 abut against the front surface of the protrusion 512 and the rear end surface of the protrusion. A float 550 may be added to the device, for example, by sliding the float axially onto the tubular protrusion 512, so that the float surrounds and is generally coaxial with the tubular protrusion 512. Typically this is done before the grip member 560 is installed; with the float 550 in place, the preferably resilient grip member 560 may be stretched and slid sideways through slit 518, through a longitudinal/axial slit along the entire length of the float and aligned with slits 518, 513 (not shown in FIG. 39, but understood by referring to FIG. 18, for example), and through slit 513 into the passageway, rotated about 90 degrees and released to substantially fill the passageway. In this embodiment, enlarged ends 566 would abut against the front surface of the protrusion 512 and the rear end surface of the protrusion and/or the rear end surface of the float. Thus, the grip member 560 captures the leader in the protrusion 550, and connects the float to the flange, so that the flange and the float are fixed relative to the leader.

The embodiment in FIGS. 37-39 may be used with or without the float, for at-the-surface applications, and submerged applications, respectively. With the simple operation of installing or removing the float, the device may be switched between operation wherein the flange is on or near the surface of the water, or entirely submerged below the surface, respectively.

Other techniques may be used to attach a flange, with or without a float, to a leader or line. Tying techniques other than those shown in FIGS. 35 and 36 may be used. Grip members techniques other than those shown in FIGS. 6-27, and 39 may be used, for example, a grip member extending through the center of an elongated protrusion 450 in the flange, without a float. Adhesives, or integral forming of the leader and strike indicator may also be used.

The preferred embodiments of the invented hook-setting device have been found to provide excellent casting, with sufficiently low weight and sufficiently low air resistance that a fly cast is not significantly interfered with. The preferred hook-setting device is fixed to the leader and does not move along the leader, after it is installed on the leader, and therefore does not move on the leader during the cast, after the cast, during or after a fish strike, or otherwise during use. Therefore, there is no movement of the device on the leader during casting and lay-out, which movement could interfere with accuracy and distance. Further, the curvature (R), the outer perimeter diameter (DP), and the flange depth (DTH) cooperate to provide excellent lay-out and water capture, which result in a high probability of a successful fish strike and of successful setting of the hook. Typically, this resistance to the fish strike and consequent hook-setting occurs within less than 1 second, and more typically within less than about 0.5 seconds, of the fish strike, because the flange is substantially filled with water as soon as it is laid-out, and there is no movement of the flange on the leader. It may take a fraction of a second to pull taught the leader (if the flowing water has momentarily caused less than a perfectly taught leader between the flange and the fly), but, because there is no movement of the flange on the line, resistance is offered immediately after that.

The preferred flange, with or without a float attached to the rear of the flange, is preferably the only structure on the leader within about 8 feet of the fly. Preferably there is no structure on the leader between the front surface of the flange and the fly, and there is preferably no structure (except the leader or line) that resides in, or slides into or out of, the interior space of the cup-shaped flange, at any time during use of the apparatus. As shown in FIGS. 9-11, 15, 16, 20, 21, 22, 26, 27, and 39, a grip member 60, 160, 560 may extend through the flange so that an end of the grip member 68, 164 abuts against a portion of the front surface of the flange. Thus, said end of the grip member may be said to be located in the cup-shaped interior space 32, 132, 232, 332, but preferably no other structure resides in the cup-shaped flange defined by the generally concave front surface of the flange except for the leader of line. Optionally, there may be a small weight near the fly, typically within about 1 ft. of the fly, if the fly is to be a "wet fly", or there may occasionally be a second fly on the leader, but the fly fishing setup more frequently consists only of the leader on the end of the fly line, a fly with a hook on the end of the leader, and the invented flange on the leader (with or without an attached float fixed to the rear surface of the flange), wherein this set-up is "operated" by a conventional fly rod and reel. There is preferably no bobber or float (other than an optional float on/in the rear surface of the flange), no structure that slides in one or more directions along the leader, and no structure that is near the cup-shaped flange at any time to interfere with it capturing water and resisting the strike to set the hook. Because the preferred flanges are positioned within 2-8 feet of the fly, and there is typically nothing between the fly and the flange, except perhaps for a weight up to about 1 ft. from the fly, one may describe many preferred fishing setups as having nothing on the fly fishing leader in front of the generally concave surface of the flange within at least 1 ft. of the front surface of the flange. A protrusion in the front surface of the flange, such as described earlier in this Description and which is preferably integral with or fixed to the flange, is part of the "generally concave front surface" of the flange and not considered to be separate or additional structure between the flange and the fly; preferably a protrusion in the front surface, if present, covers less than ¼, and more preferably less than ⅙, of the total generally concave front surface area of the flange. A protrusion in the rear surface of the flange, as discussed earlier in this Description and which is preferably integral with or fixed to the flange, is part of the "generally convex rear surface"; preferably a protrusion in the rear surface, if present, covers less than ¼ and more preferably less than ⅙, of the total generally convex rear surface area of the flange. Also, if a float is attached to the rear protrusion or rear surface of the flange, the float covers preferably less than ¼, and more preferably less than ⅙, of the total generally convex rear surface area of the flange. In preferred embodiments, the entire hook-setting and strike-indicating device is fixed so that no part of the hook-setting and strike-indicating device moves along the line or leader during or after casting into water or before, during, or after a fish strike.

To illustrate the excellent hook-setting resistance that may be obtained with embodiments of the invention, despite their extremely light weight, various structures were tested for resistance in flowing water (10 foot/7 seconds flowrate) by means of a conventional fly line scale by Umpqua™. A generally cup-shaped flange according to the invention, was fixed to the leader at 6 feet from the scale and placed in the flowing water. The test operator stood in the water holding the scale upstream of the flange, so that the resistance in the water caused by the flange could be read as the "weight" reading of the scale. The cup-shaped flange had about a 1 7/16 inch radius, 1 ⅜ inch DP, weighed 27 grains, and exhibited 15-25 grams (averaging 20 grams) resistance (pull or "weight") on the scale. On the other hand, spherical shapes attached to the leader at 8 feet from the fly exhibited the following: ¾ inch diameter sphere, weighing 33.1 grains exhibited 2-4 grams resistance (avg. 3 grams); a 1 inch diameter sphere weighing 60.3 grains exhibited 2-4 grams resistance (avg. 3 grams); a 1 ⅝ inch diameter sphere weighing 109.4 grains exhibited 7-10 grams resistance (avg. 8.5 grams); and a 2 3/16 inch diameter sphere weighing 206.2 grains exhibited 7-12 grams resistance (avg. 9-10 grams). Thus, the cup-shaped flange exhibited much greater resistance than a sphere, even though it might be much lighter in weight. In these experiments, the cup-shaped flange weighed less than any of the spheres, but exhibited 2 or more times, and up to more than 5 times, the resistance of the spheres. The preferred embodiments allow the user to obtain a large resistance in the water for excellent hook-setting, with a minimum of weight.

Although this invention has been described above with reference to particular means, materials and embodiments, it is to be understood that the invention is not limited to these disclosed particulars, but extends instead to all equivalents within the scope of the following claims.

The invention claimed is:

1. A fly-fishing apparatus for flowing water comprising:
a fly-fishing leader having a length;
a fly connected to the leader; and
a hook-setting and strike-indicating device fastened to the leader, said device comprising:
  a single cup-shaped flange having a central axis and a radial dimension, the flange being fixed to the leader so that said central axis is parallel to the length of said leader and said radial dimension extends transverse to the length of the leader;
  wherein the flange has a concave front surface facing the fly and defining a flange interior space, and the flange has a convex rear surface with a recess comprising an axial side wall and a radial bottom wall, wherein a slot extends through said flange at said radial bottom wall and wherein a portion of the slot is located at said central axis;
  a single float having a front end, a rear end, a float axis extending between said front end and said rear end, a sidewall generally parallel to said float axis, and a slit extending between said front end and rear end from said sidewall to said float axis, wherein said front end of the single float is received inside said recess so that the float axis is coaxial with said central axis of the flange;
  wherein said slot in said radial bottom wall and said slit of the float receive a portion of said leader so that the leader extends coaxial with the flange central axis and the float axis; and
wherein the device further comprises:
  an elongated elastic grip member having a grip front end and a grip rear end, the elastic grip member fastening said single float to said single flange and also fastening said float and flange to the leader, wherein the elastic grip member extends through said slot in the radial bottom wall and through the float slit and frictionally grips said portion of the leader received in said slot and said slit for said fastening of said float and flange to the leader, wherein said grip front end abuts against a front surface of said radial bottom wall and wherein said grip rear end abuts against the rear end of the float to hold the float in said recess;
wherein the entire hook-setting and strike-indicating device is fixed to the leader a set distance from the fly by means of said grip member frictionally gripping the portion of said leader that is received inside the flange slot and the float slit, so that no part of the hook-setting and strike-indicating device slides along the leader during or after casting and so that no part of the hook-setting and strike-indicating device slides along the leader during or after a fish strike.

2. A fishing apparatus as in claim 1, wherein the entire hook-setting and strike-indicating device is fixed to the fly-fishing leader 2-8 feet from the fly.

3. A fishing apparatus as in claim 2, wherein there is no structure on the leader between the flange and the fly.

4. A fishing apparatus as in claim 1, wherein the flange is a spherical cap of a hollow sphere.

5. A fishing apparatus as in claim 1, wherein the flange has a main wall that is 10-30 thousandths of an inch thick.

6. A fly-fishing apparatus for flowing water comprising:
a fly-fishing leader having a length;
a fly connected to the leader; and
a hook-setting and strike-indicating device fastened to the leader, said device consisting essentially of:

a single cup-shaped flange having a central axis and a radial dimension, the flange being fixed to the leader so that said central axis is parallel to the length of said leader and said radial dimension extends transverse to the length of the leader;

wherein the flange has a concave front surface facing the fly and defining a flange interior space, and the flange has a convex rear surface with a recess comprising an axial side wall and a radial bottom wall, wherein a slot extends through said flange at said radial bottom wall and wherein a portion of the slot is located at said central axis;

a single float having a front end, a rear end, a float axis extending between said front end and said rear end, a sidewall generally parallel to said float axis, and a slit extending between said front end and rear end from said sidewall to said float axis, wherein said front end of the single float is received inside said recess so that the float axis is coaxial with said central axis of the flange;

wherein said slot in said radial bottom wall and said slit of the float receive a portion of said leader so that the leader extends coaxial with the flange central axis and the float axis; and wherein the device further comprises:

a single elongated elastic grip member having a grip front end and a grip rear end, the elastic grip member fastening said single float to said single flange and also fastening said float and flange to the leader, wherein the elastic grip member extends through said slot in the radial bottom wall and through the float slit and frictionally grips said portion of the leader received in said slot arid said slit for said fastening of said float and flange to the leader, wherein said grip front end abuts against a front surface of said radial bottom wall and wherein said grip rear end abuts against the rear end of the float to hold the float in said recess;

wherein the entire hook-setting and strike-indicating device is fixed to the leader a set distance from the fly by means of said grip member frictionally gripping the portion of said leader that is received inside the flange slot and the float slit, so that no part of the hook-setting and strike-indicating device slides along the leader during or after casting and so that no part of the hook-setting and strike-indicating device slides along the leader during or after a fish strike.

* * * * *